United States Patent
Hong et al.

(10) Patent No.: US 9,832,282 B2
(45) Date of Patent: Nov. 28, 2017

(54) ENERGY-EFFICIENT METHOD AND APPARATUS FOR APPLICATION-AWARE PACKET TRANSMISSION

(71) Applicant: POSTECH ACADEMY—INDUSTRY FOUNDATION, Pohang-si, Gyeongsangbuk-do (KR)

(72) Inventors: Won Ki Hong, Pohang-si (KR); Jian Li, Pohang-si (KR); Jin Xiao, Pohang-si (KR); Raouf Boutaba, Ontario (CA)

(73) Assignee: POSTECH ACADEMY—INDUSTRY FOUNDATION, Pohang-si, Gyeongsangbuk-do (KR)

( * ) Notice: Subject to any disclaimer, the term of this patent is extended or adjusted under 35 U.S.C. 154(b) by 251 days.

(21) Appl. No.: 14/487,629

(22) Filed: Sep. 16, 2014

(65) Prior Publication Data
US 2015/0172155 A1    Jun. 18, 2015

(30) Foreign Application Priority Data
Dec. 18, 2013 (KR) .................. 10-2013-0157782

(51) Int. Cl.
*G06F 15/173* (2006.01)
*H04L 29/08* (2006.01)
(Continued)

(52) U.S. Cl.
CPC ........ *H04L 67/322* (2013.01); *H04L 47/2475* (2013.01); *H04L 47/283* (2013.01);
(Continued)

(58) Field of Classification Search
CPC ... H04L 47/2475; H04L 47/283; H04L 67/04; H04L 67/306; H04L 67/322;
(Continued)

(56) References Cited

U.S. PATENT DOCUMENTS

2002/0023166 A1* 2/2002 Bar-Noy .......... H04L 29/06027
709/231
2002/0129157 A1* 9/2002 Varsano ................ H04L 41/142
709/232
(Continued)

FOREIGN PATENT DOCUMENTS

KR    1020030065048 A    8/2003
KR    1020060081906 A    7/2006

OTHER PUBLICATIONS

Jian Li; Thesis: "Application-Aware Wi-Fi Energy Management on Smart Mobile Devices", Wi-Fi, Division of Electrical and Computer Engineering (Computer Sciences and Engineering).*
(Continued)

*Primary Examiner* — Michael Y Won
*Assistant Examiner* — Karina J Garcia-Ching
(74) *Attorney, Agent, or Firm* — Ladas & Parry LLP

(57) ABSTRACT

Disclosed are application-aware packet transmission methods and apparatuses for a terminal. The application-aware packet transmission method comprises classifying applications according to delay sensitivities of the applications, determining a transmission pattern of packets for the classified applications; and transmitting the packets based on the determined transmission pattern. Thus, a battery of the terminal may be efficiently managed by applying user preferences and configuring transmission patterns of packets to be transmitted for each application differently. In addition, degradation of application performances and user experiences for the uses of applications can be prevented.

14 Claims, 9 Drawing Sheets

(51) Int. Cl.
*H04L 12/859* (2013.01)
*H04L 12/841* (2013.01)

(52) U.S. Cl.
CPC ............ *H04L 67/04* (2013.01); *H04L 67/306* (2013.01); *Y02B 60/46* (2013.01)

(58) Field of Classification Search
CPC ... H04L 29/08072; H04L 29/06; H04L 43/06; Y02B 60/46
USPC .......................... 709/224, 231, 232, 233, 236
See application file for complete search history.

(56) References Cited

U.S. PATENT DOCUMENTS

| | | | |
|---|---|---|---|
| 2004/0143663 A1* | 7/2004 | Leedom | H04L 12/5695 709/226 |
| 2007/0014236 A1* | 1/2007 | Jang | H04W 74/06 370/229 |
| 2010/0111163 A1* | 5/2010 | Yang | H04N 19/147 375/240.01 |
| 2013/0194993 A1 | 8/2013 | Choi | |
| 2015/0341824 A1* | 11/2015 | Ge | H04W 48/02 370/230 |

OTHER PUBLICATIONS

Jian Li; Thesis; "Application-Aware Wi-Fi Energy Management on Smart Mobile Devices", Wi-Fi, Division of Electrical and Computer Engineering (Computer Sciences and Engineering), 2012, 62P, Advisor: James Won-Ki Hong.

\* cited by examiner

ENERGY-EFFICIENT METHOD AND APPARATUS FOR APPLICATION-AWARE PACKET TRANSMISSION

CLAIM FOR PRIORITY

This application claims priorities to Korean Patent Application No. 10-2013-0157782 filed on Dec. 18, 2013 in the Korean Intellectual Property Office (KIPO), the entire contents of which are hereby incorporated by references.

BACKGROUND

1. Technical Field

Example embodiments of the present invention relate to a technique for a packet transmission method, and more specifically to methods and apparatuses for controlling packet transmissions in consideration of characteristics of applications, which can reduce energy consumption of a mobile terminal.

2. Related Art

Recently, mobile devices such as a smart phone, etc. have become popular to users due to their convenience of use, high hardware specification and mobility. Various services utilizing such the mobile devices are appearing. Especially, among the various services, services such as a Social Networking Service (SNS), a Location Based Service (LBS), etc., which focused upon mobility and service continuity of the mobile devices, have been to the fore.

Since such the services are provided in online form according to their characteristics, connectivity to internet should be maintained in order to for them to be utilized. Most of applications demanding online connections have different internet access patterns, and they consume much energy by always maintaining their communication module responsible for data transmission and reception in activated state. Accordingly, such the energy consumption makes it difficult that mobile devices having limited battery power provide connectivity services smoothly.

Meanwhile, there exist various communication protocols such as IEEE 802.11 (Wi-Fi), WCDMA (3G), WiMax/LTE/LTE-A (4G), etc. which can provide internet access services. Also, the protocols like them have a similar power model according to transmission patterns of application using them.

Also, most of communication protocols have an active mode (AM) and a sleep mode (SM) to implement power saving mechanism. Even though different protocols have different energy consumption ratio for the active mode and the sleep mode, the sleep mode usually consumes about one fifths of power consumed in the active mode. The conventional technologies use schemes in which their signaling or packet scheduling mechanism is modified, thereby making a time duration staying in the sleep mode longer and a time staying in the active mode shorter in order to optimized energy efficiency.

However, since protocols are usually dependent on hardware in which the protocols are performed, it is not easy to modify various protocols for various mobile devices. Also, metrics such as properties of applications and user preferences, which can be accessed only in application layer, cannot be utilized by modifying protocols such as signaling and packet scheduling. Therefore, there are problems that properties of applications and user preferences are not applied to energy efficiency optimization.

SUMMARY

Accordingly, example embodiments of the present invention are provided to substantially obviate one or more problems due to limitations and disadvantages of the related art.

Example embodiments of the present invention provide an application-aware packet transmission method for a terminal, which can make the terminal transmit packets based on recognized properties of applications.

Also, example embodiments of the present invention provide an application-aware packet transmission apparatus for the terminal.

In some example embodiments, a method for application-aware packet transmission, performed in a terminal, the method may comprise classifying applications according to delay sensitivities of the applications; determining a transmission pattern of packets for the classified applications; and transmitting the packets based on the determined transmission pattern.

Here, the delay sensitivities may be determined according to degrees of interactions between a user and each of the classified applications.

Here, the determining the transmission pattern may include monitoring a bandwidth to be used by each of the classified applications and an available bandwidth of the terminal; comparing a bandwidth to be used by a first application among the classified applications with the available bandwidth of the terminal; and determining whether to delay transmission of packets for the first application based on the comparison result.

Also, in the determining whether to delay transmissions of packets, when the bandwidth to be used by the first application approaches the available bandwidth of the terminal, the transmission of packets for the first application may be determined not to be delayed.

Also, the determining whether to delay transmissions of packets may include, when the bandwidth to be used by the first application does not approach the available bandwidth of the terminal, delaying the transmission of packets for the first application for a predefined time period; detecting a packet transmission request from at least one second application during the predefined time period; and determining whether to delay transmission of the packets for the first application and the packets for the at least one second application based on the detection result.

Also, the predefined time period may be a maximum time needed for maintaining a session for communications of the first application.

Also, in the determining whether to delay transmissions of packets, when a sum of the bandwidth to be used by the first application and bandwidths to be used by the at least one second application approaches the available bandwidth of the terminal, the transmission of the packets for the first application and the packets for the at least one second application may be determined not to be delayed.

Here, the determining the transmission pattern of packets for the classified applications may include detecting at least two applications among the classified applications; selecting a first application having a highest delay sensitivity among the detected at least two applications; and aligning a transmission pattern of the packets for the detected at least two applications with a transmission pattern of the packets for the first application.

Here, the determining the transmission pattern of packets for the classified applications may include determining whether to delay packets for at least two applications among the classified applications based on bandwidth to be used by the at least two applications; and determining whether to align a transmission pattern of a second application which requests a packet transmission with a transmission pattern of a first application having a highest delay sensitivity among the at least two applications.

Also, in the determining whether to delay packets for at least two applications, it may be determined whether to delay packets for the at least two applications by comparing a sum of bandwidths to be used by the at least two applications and the second application with the available bandwidth of the terminal.

In other example embodiments, an application-aware packet transmitting apparatus may comprise a processing part classifying applications according to delay sensitivities of the applications, determining a transmission pattern of packets for the classified applications, and transmitting the packets based on the determined transmission pattern; and a storing part storing information processed or being processed in the processing part.

Here, the delay sensitivities may be determined according to degrees of interactions between a user and each of the classified applications.

Here, the processing part may monitor a bandwidth to be used by each of the classified applications and an available bandwidth of the terminal, compare a bandwidth to be used by a first application among the classified applications with the available bandwidth of the terminal, and determine whether to delay transmission of packets for the first application based on the comparison result.

Also, when the bandwidth to be used by the first application approaches the available bandwidth of the terminal, the processing part may determine not to delay the transmission of packets for the first application.

Also, when the bandwidth to be used by the first application does not approach the available bandwidth of the terminal, the processing part may delay the transmission of packets for the first application for a predefined time period, detect a packet transmission request from at least one second application during the predefined time period, and determine whether to delay transmission of the packets for the first application and the packets for the at least one second application based on the detection result.

Also, the predefined time period may be a maximum time needed for maintaining a session for communications of the first application.

Also, when a sum of the bandwidth to be used by the first application and bandwidths to be used by the at least one second application approaches the available bandwidth of the terminal, the processing part may determine not to delay the transmission of the packets for the first application and the packets for the at least one second application.

Here, the processing part may detect at least two applications among the classified applications, selects a first application having a highest delay sensitivity among the detected at least two applications, and align a transmission pattern of the packets for the detected at least two applications with a transmission pattern of the packets for the first application.

Here, the processing part may determine whether to delay packets for at least two applications among the classified applications based on bandwidth to be used by the at least two applications, and determine whether to align a transmission pattern of a second application which requests a packet transmission with a transmission pattern of a first application having a highest delay sensitivity among the at least two applications.

Also, the processing part may determine whether to delay packets for the at least two applications by comparing a sum of bandwidths to be used by the at least two applications and the second application with the available bandwidth of the terminal.

According to the above-described method for application-aware packet transmission, a battery of a terminal may be efficiently managed by applying user preferences and configuring transmission patterns of packets to be transmitted for each application differently. Also, according to the method, degradation of application performances and user experiences for the uses of applications can be prevented.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
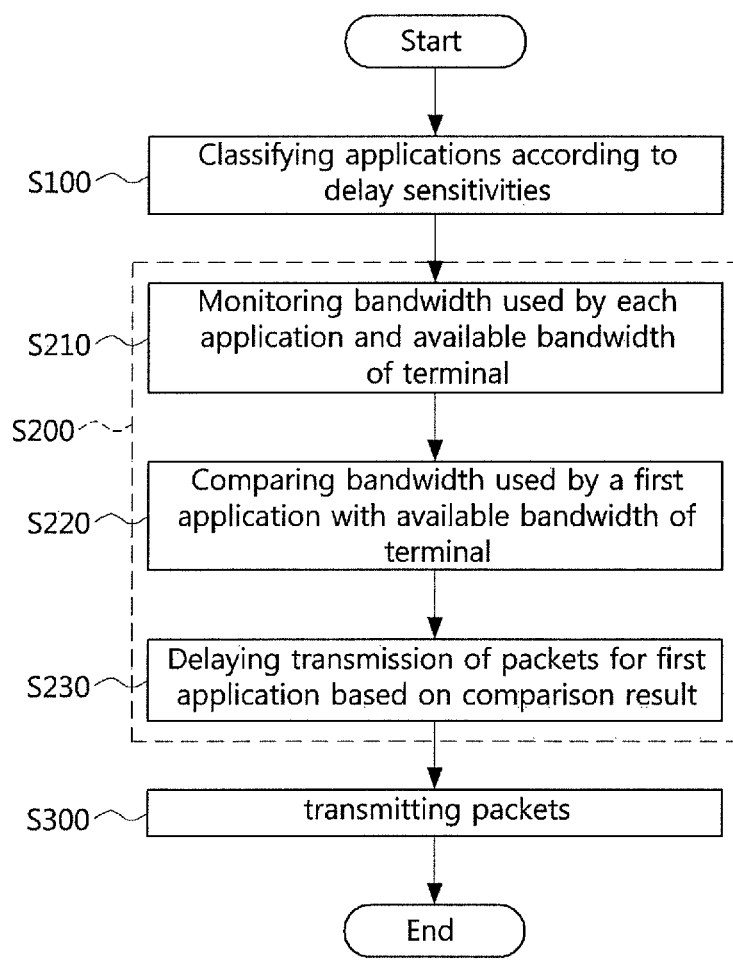
FIG. 1 is a flow chart to explain a method for delaying packet transmission for applications according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 9:
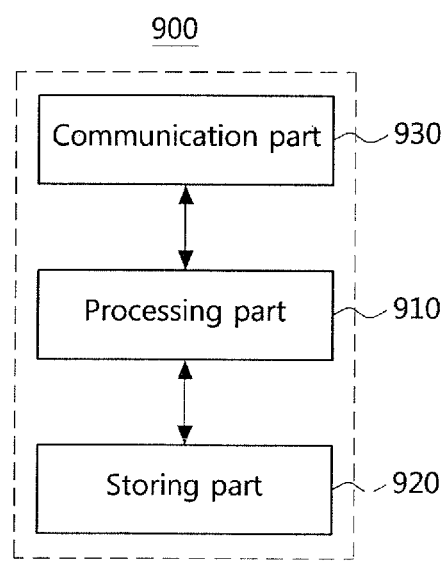
FIG. 9 is a block diagram to illustrate an application-aware packet transmission apparatus for a terminal according to the present invention.
Figure 10:
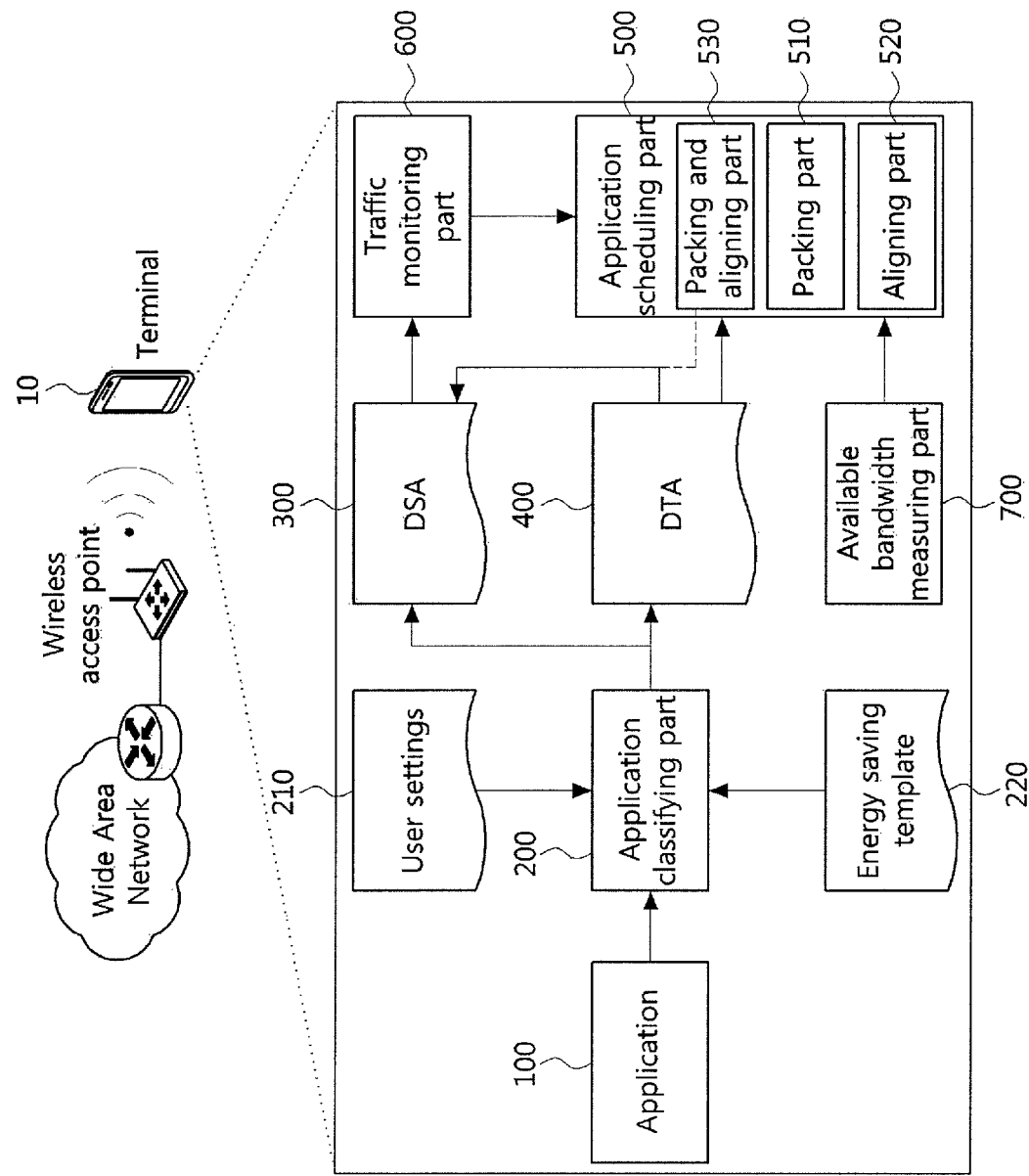
FIG. 10 is a conceptual diagram to illustrate an application-aware packet transmission apparatus for a terminal.

An application-aware packet transmission method explained through FIGS. 1 to 6 may be performed in an application-aware packet transmission apparatus explained through FIGS. 9 and 10.

FIG. 1 is a flow chart to explain a method for delaying packet transmission for applications according to an example embodiment of the present invention.

Referring to FIG. 1, a packet transmission apparatus may identify delay sensitivities of applications, and classify the applications according to their delay sensitivities (S100).

The application-aware packet transmission apparatus may be provided with user customized settings and an energy saving template from a user in order to identify the delay sensitivities of the applications.

Here, the delay sensitivity may mean a degree of interaction between each application and the user. For example, if frequent packet transmission requests are generated from an application, the delay sensitivity of the application may be considered to be high. Otherwise, the delay sensitivity of the application may be considered to be low.

More specifically, delay sensitivity may be high in applications demanding frequent executions and relatively-prompt responses such as public applications such as mobile messengers (e.g. KaKao Talk, Yahoo messenger, etc.) and social network services (e.g. Facebook, etc.). Hereinafter, the application having high delay sensitivity may be referred to as a Delay Sensitive Application (DSA).

On the contrary, delay sensitivity may be lower as the number of signal input frequency of the user for execution of the application is smaller. For example, delay sensitivity may be low in applications which do not demand prompt responses such as a background download application (e.g. a DropBox, etc.). Hereinafter, the application having low delay sensitivity may be referred to as a Delay Tolerant Application (DTA).

Then, the packet transmission apparatus may determine a transmission pattern of packets to be transmitted for the applications (S200). Here, the packet transmission apparatus may determine the transmission pattern of the packets based on the identified delay sensitivities of the applications.

Specifically, in order to determine the transmission pattern of the packets, the packet transmission apparatus may perform monitoring on a bandwidth to be used by each of the classified application and an available bandwidth of the terminal (S210).

Here, the bandwidth to be used by each application may mean a bandwidth to be used for transmitting the packets of each application, and may be estimated based on the monitoring result of traffic amount generated while executing each application. Also, the available bandwidth of the terminal may be derived based on an average bandwidth calculated during the monitoring period.

Then, the application-aware packet transmission apparatus may compare a bandwidth to be used by a first application which requests packet transmission with the available bandwidth of the terminal (S220). Meanwhile, if a plurality of applications request packet transmissions, the application-aware packet transmission apparatus may compare a sum of bandwidths requested by the plurality of applications with the available bandwidth of the terminal.

Then, the application-aware packet transmission apparatus may determine whether to delay the packet transmission for the first application based on the comparison result (S230).

Specifically, in the step S230, the application-aware packet transmission apparatus may determine not to delay transmission of the packets for the first application when the bandwidth required for transmitting the packets for the first application approaches (exceeds, or has a predefined small difference from) the available bandwidth of the terminal. On the contrary, when the bandwidth required for transmitting the packets for the first application does not approach (does not exceed, or has a predefined big difference from) the available bandwidth of the terminal, the application-aware packet transmission apparatus may determine to delay transmission of the packets for the first application for a predefined time period. Here, the predefined time period may mean a maximum time needed for maintaining a session of the packets for the first application.

After then, the application-aware packet transmission apparatus may transmit the packets for the first application based on the determination result obtained in the steps S210 to S230 (S300).

Here, the determination result may mean whether or not to delay transmission of the packet to be transmitted for the first application.

Meanwhile, the application-aware packet transmission apparatus may detect a packet transmission request from at least one other application during the predefined time period. In this case, the application-aware packet transmission apparatus may calculate a sum of bandwidths required for transmissions of packets of the first application and the at least one other application. If the calculated sum approaches (exceeds, or has a predefined small difference from) the available bandwidth of the terminal, the application-aware packet transmission apparatus may determine not to delay packet transmissions for the first application and the at least one other application. Also, in the step S300, the application-aware packet transmission apparatus may transmit the packets for the first application and the at least one other application based on the determination result obtained.

Figure 2:
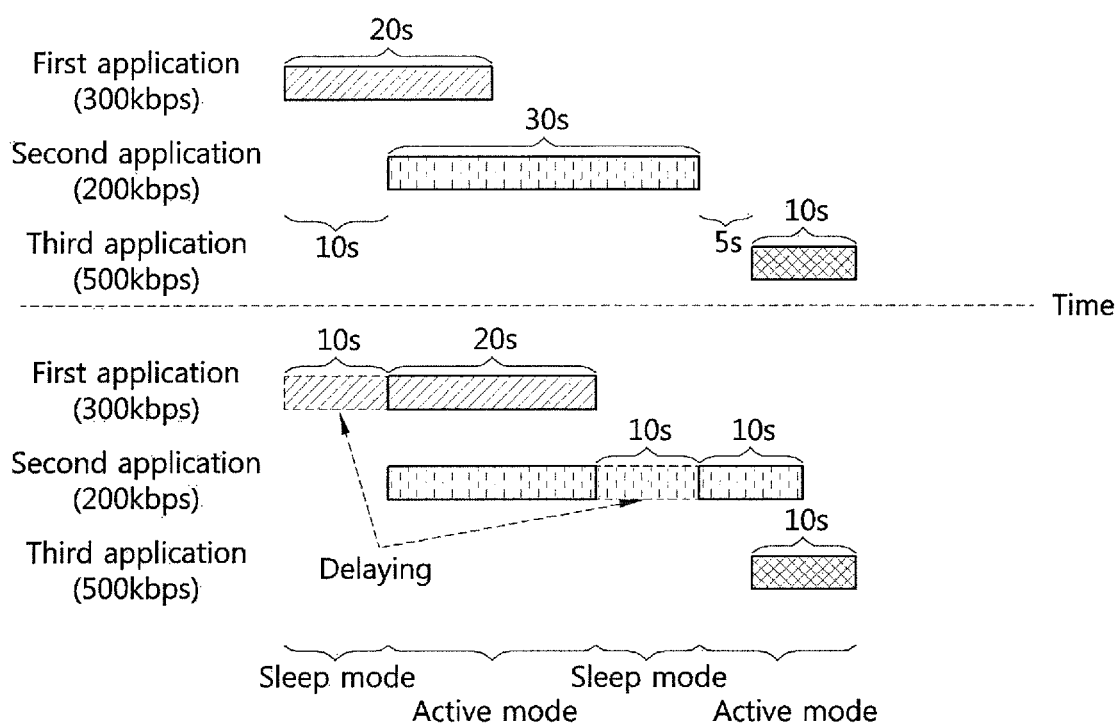
FIG. 2 is a conceptual diagram to illustrate an example to which a method for delaying packet transmission for applications is applied.

FIG. 2 is a conceptual diagram to illustrate an example to which a method for delaying packet transmission for applications is applied.

Referring to FIG. 2, the packet transmission apparatus may estimate a bandwidth used by each application and an available bandwidth of a terminal based on packet transmission rates of the applications.

For example, when a packet transmission rate of a first application is 300 kilo bits per second (kbps), a bandwidth needed for transmitting packets for the first application may be estimated based on the packet transmission rate of the first application. Also, when a packet transmission rate of a second application is 200 kbps, a bandwidth needed for transmitting packets for the second application may be estimated based on the packet transmission rate of the second application. Also, when a packet transmission rate of a third application is 500 kbps, a bandwidth needed for transmitting packets for the third application may be estimated based on the packet transmission rate of the third application. In other words, the size of the required bandwidth (500 kbps) for the third application is the largest, and the size of required bandwidth (200 kbps) for the second application is the smallest.

On the other hand, if an entire packet transmission rate of the terminal is assumed to be 500 kbps, the available bandwidth of the terminal may be estimated based on the entire packet transmission rate of the terminal. Accordingly, it can be estimated that the available bandwidth of the terminal is equal to the bandwidth required for transmitting packets for the third application.

Also, the maximum time needed for maintaining a session of packet transmission for the applications is assumed to be 10 seconds.

Also, it is assumed that the packet transmission apparatus receives packet transmission requests sequentially from the first application, the second application, and the third application.

In the conventional operation manner (illustrated in an upper part of FIG. 2), a packet transmission apparatus may transmit packets for the first application according to a packet transmission request of the first application. 10 seconds later, the packet transmission apparatus may start to transmit packets for the second application according to a packet transmission request of the second application before completion of the transmission of the packets for the first application. 30 seconds later, the packet transmission apparatus may complete packet transmissions for the first and second applications. Then, 5 seconds later, the packet transmission apparatus may start to transmit packets for the third application in response to a packet transmission request of the third application, and complete packet transmissions for all application 10 seconds later.

As described above, in the conventional operation manner, the packet transmission apparatus may operate in active mode (AM) for 50 seconds among an entire operating time 55 seconds, and operate in sleep mode (SM) only for 5 seconds.

In case that the method for delaying packet transmission according to the present invention is used (illustrated in a lower part of FIG. 2), it is assumed that the application-aware packet transmission apparatus according to the present invention receives packet transmission requests sequentially from the first application, the second application, and the third application.

The application-aware packet transmission apparatus may receive a packet transmission request from the first application. Instead of immediately starting packet transmission requested by the first application, the apparatus may determine a bandwidth required for packet transmission of the first application. In this case, when the packet transmission rate of the first application is 300 kbps and the available bandwidth of the terminal is 500 kbps, since the packet transmission rate of the first application does not approach (does not exceed, or has a predefined big difference from) the available bandwidth of the terminal, the application-aware packet transmission apparatus may delay the packet transmission for the first application for 10 seconds (the maximum time needed for maintaining a session).

Then, the application-aware packet transmission apparatus may receive a packet transmission request from the second application 10 seconds later. Also, the apparatus may determine a bandwidth required for transmitting packets for the second application. Since a sum of bandwidths required for transmitting packets for the first and second applications approaches (exceeds, or has a predefined small difference from) the available bandwidth of the terminal, the application-aware packet transmission apparatus may start to transmit packets for the first and second applications without further delay.

Then, the packet transmission for the first application is completed 20 seconds later. At this time, since the bandwidth needed for the packet transmission only for the second application does not approach (does not exceed, or has a predefined big difference from) the available bandwidth of the terminal, the application-aware packet transmission apparatus may stop transmitting packets for the second application and delay transmission of remaining packets for the second application for 10 seconds.

Then, 10 seconds later (that is, after the maximum time needed for maintaining a session elapses) the application-aware packet transmission apparatus may resume the packet transmission for the second application, and receive a packet transmission request from the third application while performing the packet transmission for the second application. Also, the apparatus may determine a bandwidth required for performing the packet transmission for the third application. At this time, a sum of bandwidths required for performing the packet transmission of the second application and the packet transmission of the third application approaches (exceeds, or has a predefined small difference from) the available bandwidth of the terminal, the application-aware packet transmission apparatus may start to transmit packets for the third application without delay.

As described above, in case that the method according to the present invention is applied, the application-ware packet transmission apparatus may operate in active mode during 35 seconds among the entire 55 seconds, and operate in sleep mode during 20 seconds.

Figure 3:
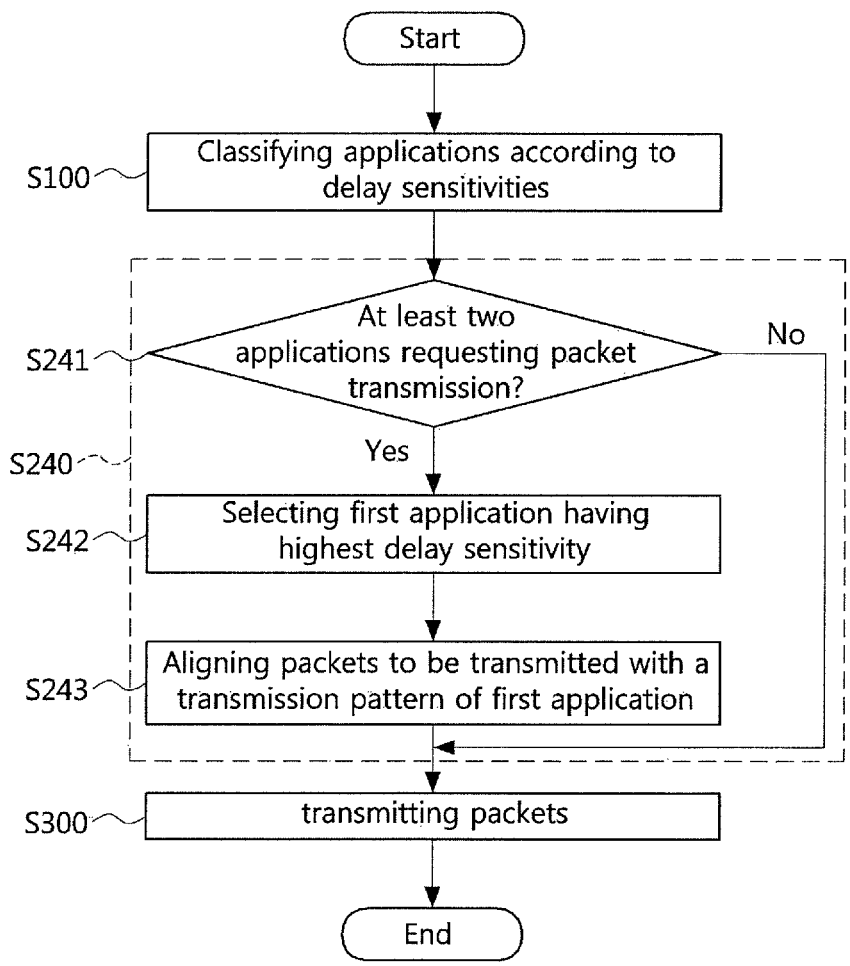
FIG. 3 is a flow chart illustrating a method for aligning packets to be transmitted by applications according to an example embodiment of the present invention.

FIG. 3 is a flow chart illustrating a method for aligning packets to be transmitted by applications according to an example embodiment of the present invention.

Referring to FIG. 3, the application-aware packet transmission apparatus may classify applications according to delay sensitivities of the applications (S100). Here, the method for classifying the applications may be identical to the one explained referring to FIG. 1.

Then, the application-aware packet transmission apparatus may determine a transmission pattern of packets to be transmitted for the classified applications (S240).

Specifically, in the determining the transmission pattern, the application-aware packet transmission apparatus may determine whether the number of applications requesting packet transmission is two or more (S241).

Then, when two or mode applications request packet transmission, the application-aware packet transmission apparatus may select a first application having the highest delay sensitivity among the applications (S242). Otherwise, when only one application requests packet transmission, the application-aware packet transmission apparatus may start to transmit packets for the application (S300). The delay sensitivity may mean a degree of interaction between each application and the user. For example, if frequent packet transmission requests are generated from an application, the delay sensitivity of the application may be considered to be high. Otherwise, the delay sensitivity of the application may be considered to be low.

Then, the application-aware packet transmission apparatus may align packets to be transmitted for other applications with a transmission pattern of the first application (S243). Then, the application-aware packet transmission apparatus may transmit packets based on the transmission pattern determined in the steps S241 to S243 (S300).

Here, the determined transmission pattern may mean a state in which packets to be transmitted are aligned with the transmission pattern of the first application having the highest delay sensitivity.

Figure 4:
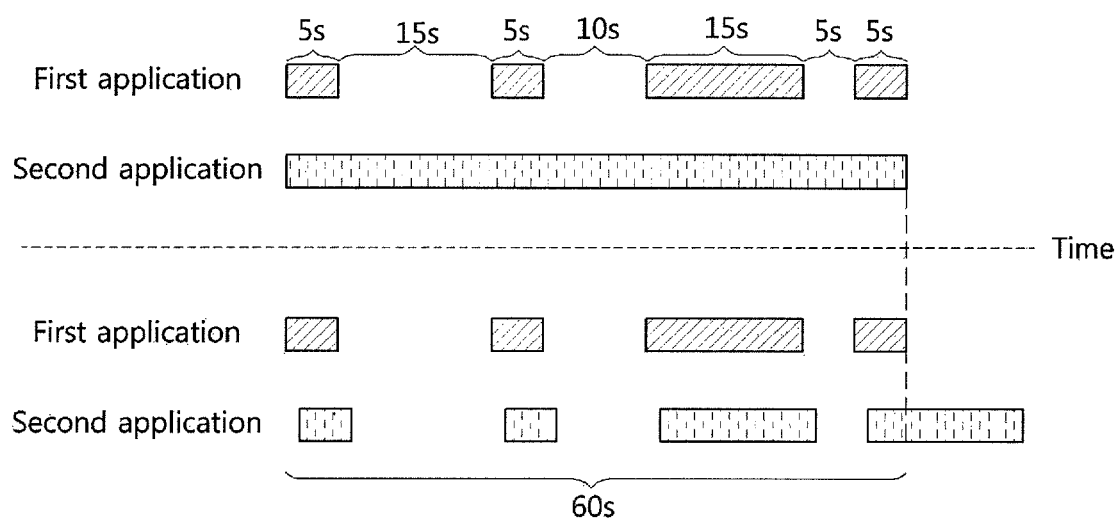
FIG. 4 is a conceptual diagram illustrating an example to which a method for aligning transmission patterns of packets to be transmitted for applications is applied.

FIG. 4 is a conceptual diagram illustrating an example to which a method for aligning transmission patterns of packets to be transmitted for applications is applied.

Referring to FIG. 4, it is assumed that a first application is a DSA as compared to a second application. Also, it is assumed that the second application is a DTA as compared to the first application.

In the conventional operation manner (illustrated in an upper part of FIG. 4), a packet transmission apparatus may receive a packet transmission request of the first application. That is, the first application may request a packet transmission intermittently. For example, the first application may request packet transmission for 5 seconds, stop requesting packet transmission for 15 seconds, and request packet transmission for 5 seconds. Simultaneously, the packet transmission apparatus may receive packet transmission requests continuously from the second application.

Here, the packet transmission apparatus should continuously operate in active mode in order to transmit packets for the first and second applications. Therefore, the packet transmission apparatus should operate in active mode for 60 seconds among an entire 60 seconds.

On the other hand, in case that the method according to the present invention is used (illustrated in a lower part of FIG. 4), the application-aware packet transmission apparatus may identify that the first application is a DSA and the second application is a DTA.

Therefore, the application-aware packet transmission apparatus may align packet transmissions for the second application with packet transmissions for the first application.

In other words, the application may transmit packets for the first and second applications intermittently, thereby optimizing sleep mode operations. Therefore, the application-aware packet transmission apparatus may operate in active mode for 30 seconds of the entire 60 seconds and in sleep mode for 30 seconds of the entire 60 seconds.

Figure 5:
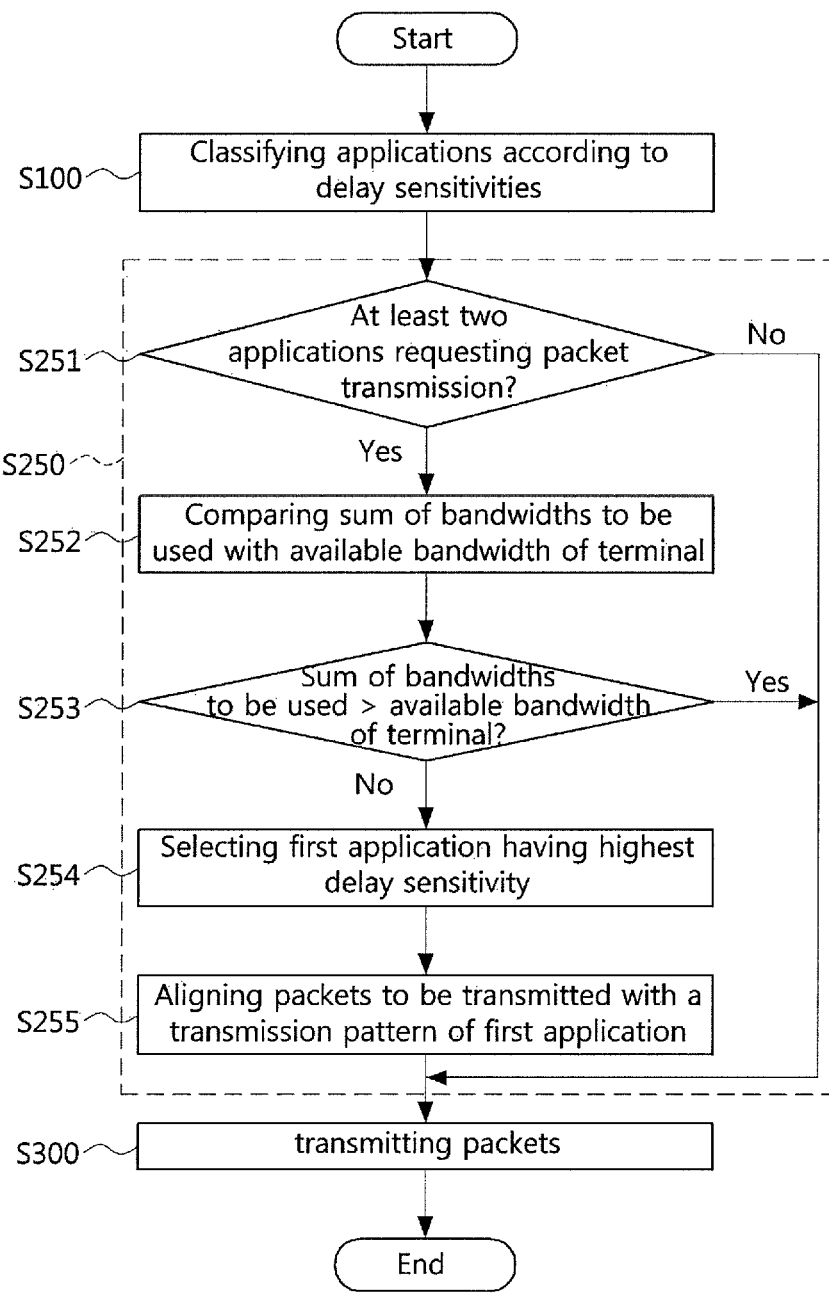
FIG. 5 is a flow chart to illustrate a method for delaying and aligning packets to be transmitted for applications according to an example embodiment of the present invention.

FIG. 5 is a flow chart to illustrate a method for delaying and aligning packets to be transmitted for applications according to an example embodiment of the present invention.

Referring to FIG. 5, an application-aware packet transmission apparatus may classify applications according to delay sensitivities of the applications (S100). Here, the detailed method for classifying applications may be identical to the step S100 explained referring to FIG. 1.

Then, the application-aware packet transmission apparatus may determine a transmission pattern of packets for the classified applications (S250).

If only one application among the classified applications requests a packet transmission, the application-aware packet transmission apparatus may compare a bandwidth to be used by the application with an available bandwidth of the terminal. Then, the application-aware packet transmission apparatus may delay the packet to be transmitted for the application for a predefined time period based on the bandwidth comparison result.

Then, during the predefined time period, the application-aware packet transmission apparatus may determine whether two or more applications among the classified applications request packet transmissions (S251).

If two or more applications request packet transmissions, the application-aware packet transmission apparatus may compare a sum of bandwidths required by the plurality of applications with the available bandwidth of the terminal (S252). Otherwise, if only one application requests packet transmission, the application-aware packet transmission apparatus may transmit the packet to be transmitted for the application (S300).

Then, the application-aware packet transmission apparatus may determine whether the sum of bandwidths required by the plurality of applications approaches (exceeds, or has a predefined small difference from) the available bandwidth of the terminal (S253). The application-aware packet transmission apparatus may transmit the packets to be transmitted for the application when the sum of bandwidths required by the plurality of applications approaches (exceeds, or has a predefined small difference from) the available bandwidth of the terminal (S300).

Otherwise, the application-aware packet transmission apparatus may determine to delay the packets to be transmitted for the applications for a predefined time period when the bandwidth required for transmitting the packet for the application does not approach (does not exceed, or has a predefined big difference from) the available bandwidth of the terminal.

Then, after the application-aware packet transmission apparatus delays transmissions of the packet for the applications for the predefined time period, the first application having the highest delay sensitivity may be selected among the applications (S254).

Then, the application-aware packet transmission apparatus may align the packets to be transmitted for the applications requesting packet transmission with the transmission pattern of the packets to be transmitted for the first application (S255).

Then, the application-aware packet transmission apparatus may transmit packets to be transmitted for the applications according to the transmission pattern determined through the steps S251 to S255 (S300).

Here, the determined transmission pattern may mean a state in which packets to be transmitted are delayed for the predefined time period and then aligned with the transmission pattern of the application having the highest delay sensitivity.

Figure 6:
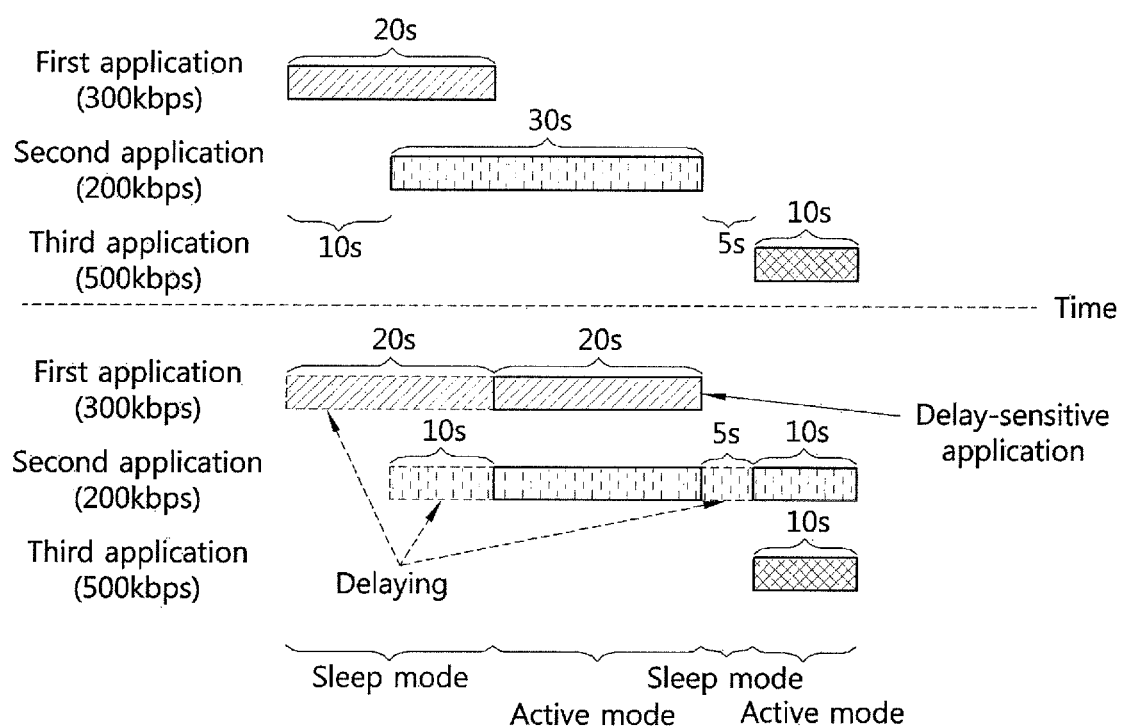
FIG. 6 is a conceptual diagram to illustrate an example to which a method for delaying and aligning packets to be transmitted for applications is applied.

FIG. 6 is a conceptual diagram to illustrate an example to which a method for delaying and aligning packets to be transmitted for applications is applied.

Referring to FIG. 6, the packet transmission apparatus may accurately estimate a bandwidth to be used by each application and available bandwidth of the terminal based on packet transmission rates of the applications, according to the method for delaying and aligning packets for applications identical to the method explained referring to FIG. 2.

For example, when a packet transmission rate of a first application is 300 kilo bits per second (kbps), a bandwidth needed for transmitting packets for the first application may be estimated based on the packet transmission rate of the first application. Also, when a packet transmission rate of a second application is 200 kbps, a bandwidth needed for transmitting packets for the second application may be estimated based on the packet transmission rate of the second application. Also, when a packet transmission rate of a third application is 500 kbps, a bandwidth needed for transmitting packets for the third application may be estimated based on the packet transmission rate of the third application. That is, the size of required bandwidth for the third application is the largest, and the size of required bandwidth for the second application is the smallest.

Also, if an entire packet transmission rate of the terminal is assumed to be 600 kbps, the available bandwidth of the terminal may be estimated based on the packet transmission rate of the terminal. Accordingly, it can be estimated the available bandwidth of the terminal has the largest value, and the bandwidth to be used by the third application, the first application, and the second application becomes smaller in order of them.

Also, the maximum time needed for maintaining a session of packet transmission for the applications is assumed to be 20 seconds.

The conventional operation manner to which the method for delaying and aligning packets according to the present invention is not applied may be identical to the conventional operation manner illustrated in the upper part of FIG. 3.

On the contrary, in case that the method for delaying packet transmission according to the present invention is applied (illustrated in a lower part of FIG. 6), the application-aware packet transmission apparatus may receive a packet transmission request from the first application. Also, the application-aware packet transmission apparatus may identify a bandwidth to be used by the first application. The application-aware packet transmission apparatus may determine that the bandwidth to be used by the first application does not exceed the available bandwidth of the terminal, and determine to delay the packet transmission of the first application.

10 seconds later, the application-aware packet transmission apparatus may receive a packet transmission request from the second application, and identify a bandwidth to be used by the second application. Then, the application-aware packet transmission apparatus may identify that a sum of bandwidths to be used by the first and second applications does not approach (does not exceed, or has a predefined big difference from) the available bandwidth of the terminal, and determine to delay the packet transmissions of the first and second applications.

10 seconds later, since the transmission of the packet for the first application is delayed for the maximum session maintaining time (20 seconds), the application-aware packet transmission apparatus may recognize the first application as a more delay-sensitive application as compared to the second application.

Then, the application-aware packet transmission apparatus may align the packets to be transmitted for the second application with the transmission pattern of the packets for the first application which is a more delay-sensitive application, and start to transmit the packets for the first and second applications. 20 seconds later, the application-aware packet transmission apparatus may complete transmission of the packets for the first application.

Then, since the bandwidth to be used by the second application does not approach (does not exceed, or has a predefined big difference from) the available bandwidth of the terminal (since the transmission for the first application is completed), the application-aware packet transmission apparatus may delay transmission of the packets for the second application.

While the transmission of the packets for the second application is being delayed, the application-aware packet transmission apparatus may receive a packet transmission request from the third application, and identify a bandwidth to be used by the third application. Since the packet transmission rate of the third application is 500 kbps, the application-aware packet transmission apparatus may determine that a sum of the bandwidths to be used by the second and third applications approaches (exceeds, or has a predefined small difference from) the available bandwidth of the terminal.

Therefore, the application-aware packet transmission apparatus may start to transmit the packets for the second and third applications.

As described above, if the method for delaying and aligning packets for applications is applied, the terminal may operate in active mode for 30 seconds of the entire 55 seconds and operate in sleep mode for 25 seconds of the entire 55 seconds.

Figure 7:
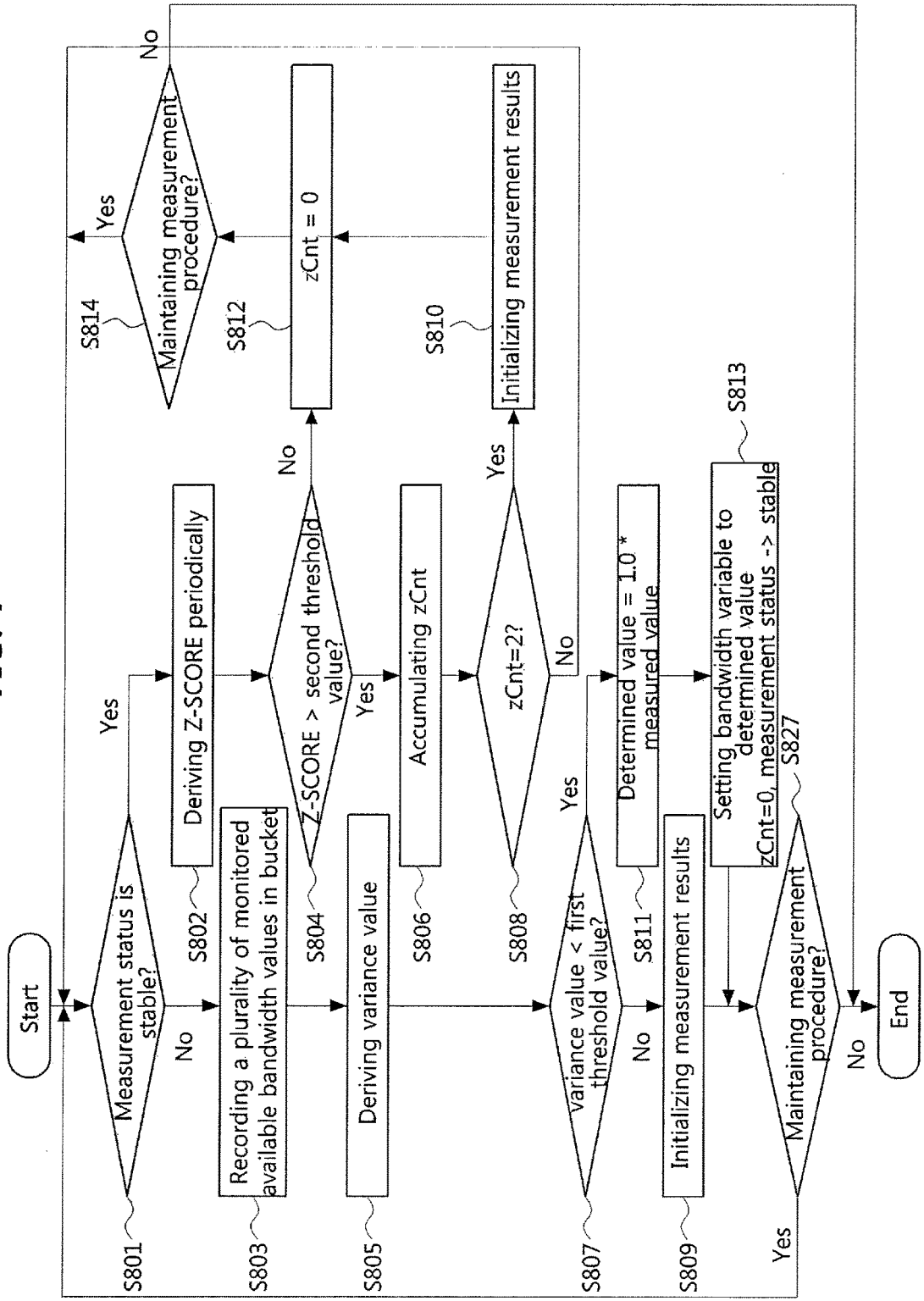
FIG. 7 is a flow chart to illustrate a method for measuring available bandwidth of a terminal according to an example embodiment of the present invention.

FIG. 7 is a flow chart to illustrate a method for measuring available bandwidth of a terminal according to an example embodiment of the present invention.

Referring to FIG. 7, a method in which an application-aware packet transmission apparatus measures available bandwidth of the terminal may be explained.

As shown in FIG. 7, first, the application-aware packet transmission apparatus may determine whether measurement status for the available bandwidth of the terminal is stable or not (S801).

The application-aware packet transmission apparatus may estimate a bandwidth of the terminal according to traffic amount monitored periodically for a predetermined time period, and may determine the estimated bandwidth as the available bandwidth of the terminal. Then, a variance value of the available bandwidth may be derived, and the measurement status for the available bandwidth of the terminal may be determined to be stable when the variance value does not exceed a predefined threshold value.

On the contrary, the application-aware packet transmission apparatus may determine the measurement status for the available bandwidth of the terminal as instable when the variance value exceeds the predefined threshold value.

Then, when the measurement status is determined to be unstable, the application-aware packet transmission apparatus may record a plurality of values periodically measured as the available bandwidth of the terminal in a bucket (S803).

Here, the bucket may perform a role of a storage which can store the plurality of measured values. Then, the application-aware packet transmission apparatus may calculate a variance value of the plurality of measure values stored in the bucket (S805), and may compare the calculated variance value with a first threshold value (S807).

Then, when the variance value is not less than the first threshold value, the application-aware packet transmission apparatus may determine that the plurality of measured values are incorrectly monitored ones and initialize the monitoring results (S809). Then, the application-aware packet transmission apparatus may return to the step S801, thereby repeating the step of determining measurement status for available bandwidth of the terminal.

On the contrary, if the variance value is less than the first threshold value, the application-aware packet transmission apparatus may determine the plurality of measured values are correctly monitored ones and determine the available bandwidth of the terminal based on the measured values (S811).

Then, the application-aware packet transmission apparatus may assign the determined available bandwidth of the terminal to a bandwidth variable, and set a variable zCnt to 0. Also, the application-aware packet transmission apparatus may determine the measurement status for the available bandwidth of the terminal as stable.

Here, the variable zCnt may mean the measurement status for the available bandwidth of the terminal, and it may have a value of 0 in case that the measurement status is stable. Otherwise, the variable may have a value of 1. Then, the application-aware packet transmission apparatus may return to the step S801 and repeat the step of measuring the available bandwidth of the terminal.

In case that the application-aware packet transmission apparatus determines that the measurement status is stable in the step S801, it may derive a value of Z-SCORE periodically based on the plurality of already-measured bandwidth values and a newly-measured bandwidth value (S802).

Then, the application-aware packet transmission apparatus may compare the derived Z-SCORE value with a second threshold value (S804).

Then, if the Z-SCORE value is not less than the second threshold value, the value of zCnt may be increased by 1, and be accumulated.

Then, the application-aware packet transmission apparatus may determine whether the accumulated value of zCnt is '2' (S808). Here, the value '2' of the zCnt may mean that the value of Z-SCORE becomes equal to or greater than the second threshold value twice.

Then, the application-aware packet transmission apparatus may initialize measurement results when the value of zCnt is '2' (S810). Also, the application-aware packet transmission apparatus may initialize the value of zCnt to 0 (S812). Then, the application-aware packet transmission apparatus may return to the step S801 and repeat the step of measuring the available bandwidth of the terminal.

If the Z-SCORE value is less than the second threshold value, the application-aware packet transmission apparatus may determine that the zCnt value is '0' (S812). Then, the application-aware packet transmission apparatus may return to the step S801 and repeat the step of measuring the available bandwidth of the terminal.

As described above, the application-aware packet transmission apparatus may measure the available bandwidth of the terminal correctly by repeating the steps S801 to S813.

Figure 8:
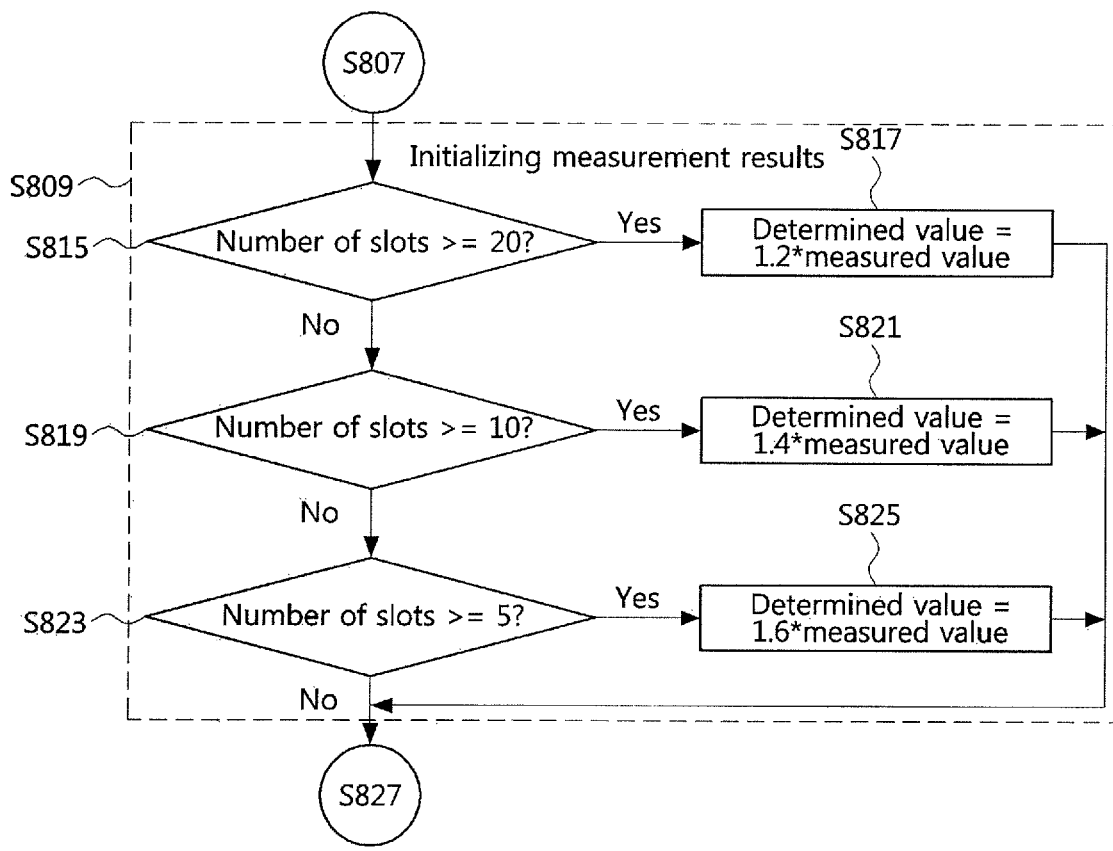
FIG. 8 is a flow chart to illustrate a step of initializing measurement results illustrated in FIG. 7.

FIG. 8 is a flow chart to illustrate a step of initializing measurement results illustrated in FIG. 7.

Referring to FIG. 8, when the variance value exceeds the first threshold value in the step S807, the application-aware packet transmission apparatus may determine whether the number of slots in the bucket is not less than 20 (S815). If the application-aware packet transmission apparatus determines that the whether the number of slots in the bucket is less than 20, it may determine whether the number of slots is not less than 10 (S819).

Otherwise, if the number of slots in the bucket is equal to or greater than 20 in the step S815, the application-aware packet transmission apparatus may determine the available bandwidth of the terminal by multiplying the measure bandwidth value with 1.2 (S817). Then, the application-aware packet transmission apparatus may return to the step S801 and repeat the step of measuring the available bandwidth of the terminal.

Then, if the number of slots in the bucket is less than 10, the application-aware packet transmission apparatus may determine whether the number of slots is not less than 5 (S823).

Otherwise, if the number of slots in the bucket is equal to or greater than 10 in the step S819, the application-aware packet transmission apparatus may determine the available bandwidth of the terminal by multiplying the measure bandwidth value with 1.4 (S821). Then, the application-aware packet transmission apparatus may return to the step S801 and repeat the step of measuring the available bandwidth of the terminal.

Then, if the number of slots in the bucket is less than 5 in the step S823, the application-aware packet transmission apparatus may return to the step S801 and repeat the step of measuring the available bandwidth of the terminal.

Otherwise, if the number of slots in the bucket is equal to or greater than 5 in the step S823, the application-aware packet transmission apparatus may determine the available bandwidth of the terminal by multiplying the measure bandwidth value with 1.6 (S825). Then, the application-aware packet transmission apparatus may return to the step S801 and repeat the step of measuring the available bandwidth of the terminal.

As described above, the application-aware packet transmission apparatus may measure the available bandwidth of the terminal correctly by repeating the steps S815 to S825.

FIG. 9 is a block diagram to illustrate an application-aware packet transmission apparatus for a terminal according to the present invention, and FIG. 10 is a conceptual diagram to illustrate an application-aware packet transmission apparatus for a terminal.

Referring to FIG. 9 and FIG. 10, configurations of an application-aware packet transmission apparatus for a terminal may be explained.

Referring to FIG. 9, the application-aware packet transmission apparatus 900 may comprise a processing part 910, a storage part 920, and a communication part 930.

Here, the processing part 910 may comprise an application classifying part 200, an application scheduling part 500, a traffic monitoring part 600, and an available bandwidth measuring part 700.

Also, the application scheduling part 500 may comprise a packing part 510, an aligning part 520, and a packing and aligning part 530.

Here, the processing part 910 may comprise a processor and a memory. The processor may be a general-purpose processor such as a Central Processing Unit (CPU), a Graphic Processing Unit (GPU), etc. or a processor designed as dedicated to execution of the method according to the present invention. The memory may store program codes for implementing the method according to the present invention. That is, the processor may read the program codes stored in the memory, and execute the program code in order to perform the method according to the present invention.

The storage part 920 may store information processed or to be processed by the processing part 910. For example, the storage part 920 may store the number packet transmission requests received from applications, bandwidth to be used for each application, available bandwidth of the terminal, maximum time needed for maintaining session, etc.

The communication part 930 may receive or transmit the information processed or to be processed by the processing part 910 from or to external devices such as an internet server, a file server, an access point, etc.

Referring to FIG. 10, the application-aware packet transmission apparatus may be configured as included in a terminal which can execute a plurality of applications, for example, a cellular phone, a smart phone, a pad-type terminal, etc.

As shown in FIG. 10, the terminal 10 may have a plurality of applications 100 which can be executed by internet access.

The application classifying part 200 may classify the plurality of applications 100 according to their delay sensitivities. Here, the detail method for classifying the applications may be identical to the step S100 explained referring to FIG. 1.

Also, the application classifying part 200 may be provided with user customized settings 210 and energy saving template 200 in order to classify the applications 100.

Then, the application classifying part 200 may classify the plurality of applications 100 into delay sensitive applications (DSA) 300 and delay tolerant applications (DTA) 400.

The traffic monitoring part 600 may perform periodic monitoring on traffic patterns of the delay tolerant applications, and transmit the monitored results to the application scheduling part 500.

The available bandwidth measuring part 700 performs determination on whether the measurement status for the available bandwidth of the terminal is stable or not, and so enhance accuracy of the available bandwidth measurement. Here, the detail methods for enhancing measurement accuracy may be identical to the methods explained referring to FIG. 7 and FIG. 8.

The application scheduling part 500 may transfer packets for applications to at least one of the packing part 510, the aligning part 520, and the packing and aligning part 530 according to the type of each application. Here, the type of each application may mean a DSA type or a DTA type.

The packing part 510 may delay transmission of packets to be transmitted for applications for a predefined time period. For example, when at least two delay-tolerant applications desire to transmit packets for each, the application scheduling part 500 may transfer the packets for the applications to the packing part 510. Then, the packing part 510 may delay transmission of the packet for the predefined time period. Here, the detail method for delaying packet transmission may be identical to the method explained referring to FIG. 1.

Also, the aligning part 520 may align packets to be transmitted for applications. For example, when a delay-sensitive application and a delay-tolerant application simultaneously desire to transmit packets for each, the application scheduling part 500 may transfer the packets to the aligning part 520. Then, the aligning part 520 may align a transmission pattern of the packets with a transmission pattern of packets for the delay-sensitive application. Here, the detail method for aligning the packets in the aligning part 520 may be identical to the method explained referring to FIG. 3.

Also, the packing and aligning part 530 may delay packets to be transmitted for applications and then align transmission patterns of the packet. For example, packet transmission of a delay-tolerant application has been delayed for a long time, the application scheduling part 500 may transfer the packets of the delay-tolerant application to the packing and aligning part 530. Then, after the packet transmission of the delay-tolerant application has been delayed for the predefined time period, the packing and aligning part 530 may align the transmission pattern of packets of the delay-tolerant application with the transmission pattern of packets for the delay-sensitive application. Here, the detailed method for delaying and aligning packets may be identical to the method explained referring to FIG. 5.

While the example embodiments of the present invention and their advantages have been described in detail, it should be understood that various changes, substitutions and alterations may be made herein without departing from the scope of the invention.

What is claimed is:

1. A method for application-aware packet transmission, performed in a terminal, the method comprising:
   classifying applications according to delay sensitivities of the applications;
   determining a transmission pattern of packets for the classified applications; and
   transmitting the packets based on the determined transmission pattern
   wherein the determining the transmission pattern of packets for the classified applications includes:
   detecting at least two applications among the classified applications;
   selecting a first application having a highest delay sensitivity among the detected at least two applications; and
   aligning a transmission pattern of the packets for the detected at least two applications with a transmission pattern of the packets for the first application.

2. The method of claim 1, wherein the delay sensitivities are determined according to degrees of interactions between a user and each of the classified applications, and user preferences for the classified applications.

3. The method of claim 1, wherein the determining the transmission pattern includes:
   monitoring a bandwidth to be used by each of the classified applications and an available bandwidth of the terminal;
   comparing a bandwidth to be used by a first application among the classified applications with the available bandwidth of the terminal; and
   determining whether to delay transmission of packets for the first application based on the comparison result.

4. The method of claim 3, wherein, in the determining whether to delay transmissions of packets, when the bandwidth to be used by the first application is larger than the available bandwidth of the terminal, the transmission of packets for the first application is determined not to be delayed.

5. The method of claim 3, wherein the determining whether to delay transmissions of packets includes, when the bandwidth to be used by the first application is lower than the available bandwidth of the terminal,
   delaying the transmission of packets for the first application for a predefined time period;
   detecting a packet transmission request from at least one second application during the predefined time period; and
   determining whether to delay transmission of the packets for the first application and the packets for the at least one second application based on the detection result.

6. The method of claim 5, wherein the predefined time period is a maximum time needed for maintaining a session for communications of the first application.

7. The method of claim 5, wherein, in the determining whether to delay transmissions of packets, when a sum of the bandwidth to be used by the first application and bandwidths to be used by the at least one second application is higher than the available bandwidth of the terminal, the transmission of the packets for the first application and the packets for the at least one second application is determined not to be delayed.

8. An application-aware packet transmitting apparatus comprising:
- a processing part classifying applications according to delay sensitivities of the applications, determining a transmission pattern of packets for the classified applications, and transmitting the packets based on the determined transmission pattern; and
- a storing part storing information processed or being processed in the processing part
- wherein the processing part detects at least two applications among the classified applications, selects a first application having a highest delay sensitivity among the detected at least two applications, and aligns a transmission pattern of the packets for the detected at least two applications with a transmission pattern of the packets for the first application.

9. The apparatus of claim 8, wherein the delay sensitivities are determined according to degrees of interactions between a user and each of the classified applications, and user preferences for the classified applications.

10. The apparatus of claim 8, wherein the processing part monitors a bandwidth to be used by each of the classified applications and an available bandwidth of the terminal, compares a bandwidth to be used by a first application among the classified applications with the available bandwidth of the terminal, and determines whether to delay transmission of packets for the first application based on the comparison result.

11. The apparatus of claim 10, wherein, when the bandwidth to be used by the first application is larger than the available bandwidth of the terminal, the processing part determines not to delay the transmission of packets for the first application.

12. The apparatus of claim 10, wherein, when the bandwidth to be used by the first application is lower than the available bandwidth of the terminal, the processing part delays the transmission of packets for the first application for a predefined time period, detects a packet transmission request from at least one second application during the predefined time period, and determines whether to delay transmission of the packets for the first application and the packets for the at least one second application based on the detection result.

13. The apparatus of claim 12, wherein the predefined time period is a maximum time needed for maintaining a session for communications of the first application.

14. The apparatus of claim 12, wherein, when a sum of the bandwidth to be used by the first application and bandwidths to be used by the at least one second application is higher than the available bandwidth of the terminal, the processing part determines not to delay the transmission of the packets for the first application and the packets for the at least one second application.

* * * * *